(12) United States Patent
Abnous et al.

(10) Patent No.: US 10,545,981 B2
(45) Date of Patent: Jan. 28, 2020

(54) VIRTUAL REPOSITORY MANAGEMENT

(71) Applicant: EMC Corporation, Hopkinton, MA (US)

(72) Inventors: Razmik Abnous, Danville, CA (US); Victor Spivak, San Mateo, CA (US); Eric Merhoff, Walnut Creek, CA (US)

(73) Assignee: EMC Corporation, Hopkinton, MA (US)

( * ) Notice: Subject to any disclaimer, the term of this patent is extended or adjusted under 35 U.S.C. 154(b) by 742 days.

(21) Appl. No.: 14/945,763

(22) Filed: Nov. 19, 2015

(65) Prior Publication Data

US 2016/0078114 A1      Mar. 17, 2016

Related U.S. Application Data

(63) Continuation of application No. 14/282,126, filed on May 20, 2014, now Pat. No. 9,223,817, which is a continuation of application No. 13/189,230, filed on Jul. 22, 2011, now Pat. No. 8,782,096, which is a continuation of application No. 11/355,556, filed on Feb. 16, 2006, now Pat. No. 8,015,222.

(60) Provisional application No. 60/729,987, filed on Oct. 24, 2005, provisional application No. 60/764,896, filed on Feb. 3, 2006.

(51) Int. Cl.
*G06F 16/25* (2019.01)
*G06F 16/22* (2019.01)
*G06F 16/27* (2019.01)
*G06F 16/958* (2019.01)

(52) U.S. Cl.
CPC ............ *G06F 16/256* (2019.01); *G06F 16/22* (2019.01); *G06F 16/27* (2019.01); *G06F 16/972* (2019.01)

(58) Field of Classification Search
CPC ......... G06F 17/30575; G06F 17/30893; G06F 17/30566; G06F 17/30312; G06F 16/178; G06F 16/27; G06F 16/256; G06F 16/972
USPC ................................................. 707/828, 831
See application file for complete search history.

(56) References Cited

U.S. PATENT DOCUMENTS

| | | | | |
|---|---|---|---|---|
| 6,591,272 | B1 * | 7/2003 | Williams | G06F 16/289 |
| 2003/0046239 | A1 * | 3/2003 | Geilfuss | G06Q 30/02 |
| | | | | 705/51 |
| 2003/0191719 | A1 * | 10/2003 | Ginter | G06F 21/10 |
| | | | | 705/54 |
| 2003/0193994 | A1 * | 10/2003 | Stickler | G06F 16/40 |
| | | | | 375/150 |
| 2004/0215635 | A1 * | 10/2004 | Chang | G06Q 10/10 |

\* cited by examiner

*Primary Examiner* — James Trujillo
*Assistant Examiner* — Fariborz Khoshnoodi
(74) *Attorney, Agent, or Firm* — Van Pelt, Yi & James LLP

(57) ABSTRACT

Virtual repository management is disclosed. An indication is received that a content management functionality is desired to be available with respect to one or more external content items. A reference object is created for each for the one or more external content items that represents the external content item and enables the content management functionality to be performed with respect to the external content item.

18 Claims, 8 Drawing Sheets

VIRTUAL REPOSITORY MANAGEMENT

CROSS REFERENCE TO OTHER APPLICATIONS

This application is a continuation of U.S. patent application Ser. No. 14/282,126, entitled VIRTUAL REPOSITORY MANAGEMENT filed May 20, 2014 which is incorporated herein by reference for all purposes, which is a continuation of U.S. patent application Ser. No. 13/189,230, now U.S. Pat. No. 8,782,096, entitled VIRTUAL REPOSITORY MANAGEMENT filed Jul. 22, 2011 which is incorporated herein by reference for all purposes, which is a continuation of U.S. patent application Ser. No. 11/355,556, now U.S. Pat. No. 8,015,222, entitled VIRTUAL REPOSITORY MANAGEMENT filed Feb. 16, 2006 which is incorporated herein by reference for all purposes, which claims priority to U.S. Provisional Application No. 60/729,987, entitled VIRTUAL REPOSITORY MANAGEMENT filed Oct. 24, 2005 which is incorporated herein by reference for all purposes. U.S. patent application Ser. No. 11/355,556 also claims priority to U.S. Provisional Application No. 60/764,896, entitled VIRTUAL REPOSITORY MANAGEMENT TO PROVIDE RETENTION MANAGEMENT SERVICES filed Feb. 3, 2006 which is incorporated herein by reference for all purposes.

BACKGROUND OF THE INVENTION

Information can be stored or managed by systems designed to help organize, manage, or otherwise provide useful functionality to the user or owner of the information. In some cases, an owner of information can have multiple systems that are managing or storing information that the owner desires to be able to control or manage in a similar, uniform, consistent, and/or verifiable manner. This can be especially true for documents that need to be retained or disposed for regulatory purposes. For example, financial, corporate, litigation, medical, personnel, and securities information may all have requirements that an owner would want to meet for information in all of the systems that the owner has information stored in or managed by. However, the multiple systems may not be able to be controlled or managed natively in a similar or uniform manner. One approach to this problem has been to migrate content to a common platform, such as a common content management system, but in many cases such migration is time consuming and otherwise costly, given the vast amounts of data held and/or produced by some enterprises, for example, and migration does not enable owners of data to take advantage of useful life and/or desirable characteristics and/or native functionality of legacy systems. It would be beneficial to be able to control or manage multiple systems with different characteristics in a similar or uniform manner.

BRIEF DESCRIPTION OF THE DRAWINGS

Various embodiments of the invention are disclosed in the following detailed description and the accompanying drawings.

DETAILED DESCRIPTION

Figure 1:
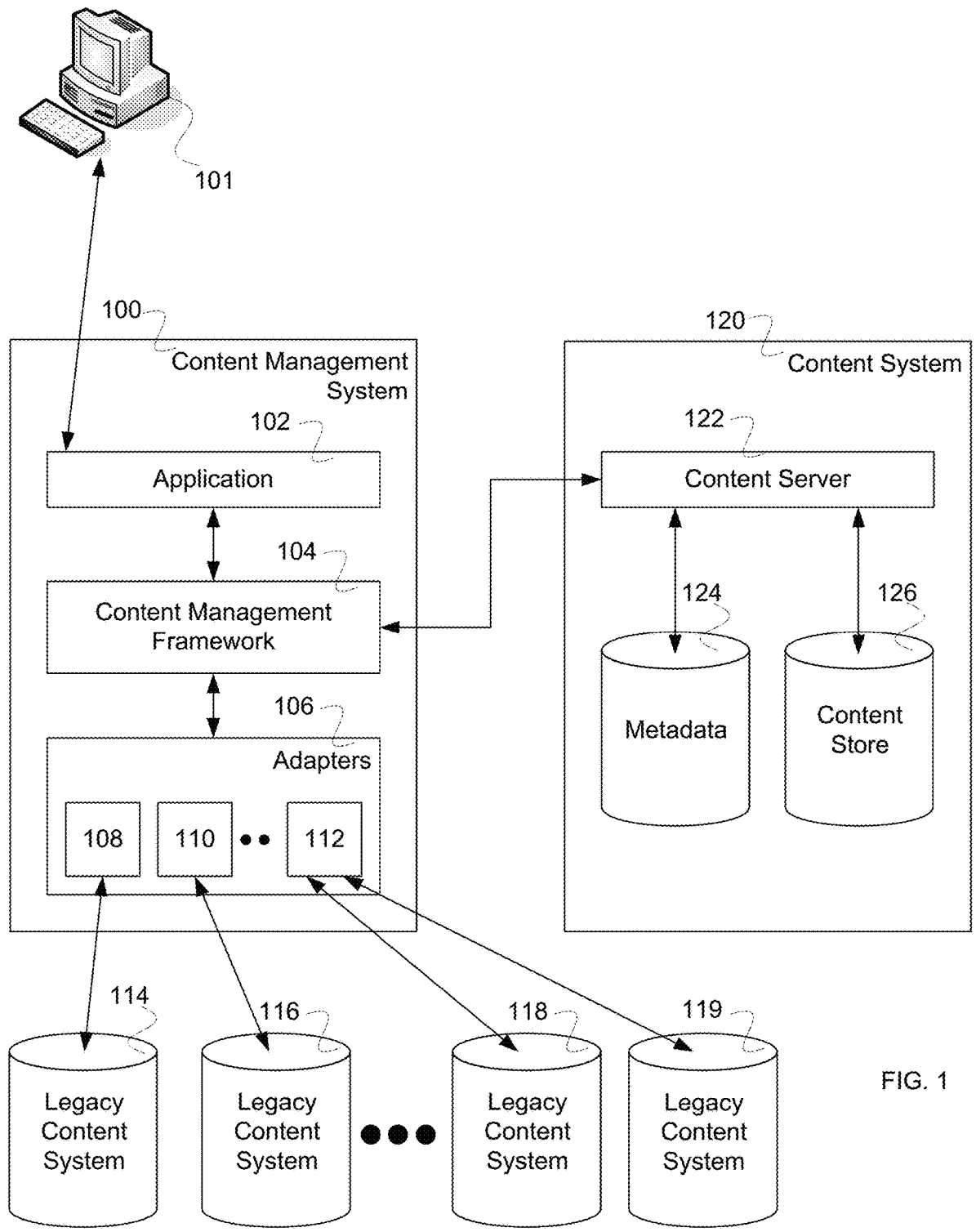
FIG. 1 is a block diagram illustrating an embodiment of a system for virtually managing repositories.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Virtual repository management is disclosed. An indication is received that a content management functionality is desired to be available and/or performed with respect to one or more external content items. As used herein, the term "external content item" refers to a content item, such as a file or other stored item, that is not ingested by and brought under direct control of a content management system and/or other system or application that is being used and/or configured to perform one or more content management functions with respect to the content item. Examples of external content items include files and other items managed by a "legacy" (for example, an older version of a content management system) or other content management system that is of a different type, e.g., from a different vendor or designed for a purpose other than content management (for example, customer relations management), than a content management system or application that is being used to provide one or more content management functions with respect to items stored in and managed by the legacy or other system. For each of at least a subset of the one or more external content items a reference object is created that represents the external item and enables the content management functionality to be performed with respect to the external content item. In various embodiments, the content management functionality is retention management, business process management, customer relations, or security management.

FIG. 1 is a block diagram illustrating an embodiment of a system for virtually managing repositories. In the example shown, content management system 100 is coupled to content system 120 and one or more user systems, which are represented in FIG. 1 by the personal computer or workstation 101. In various embodiments, content management system 100 is coupled to content system 120 and one or more user systems using a local network, a wide area network, the Internet, a wired network, a wireless network, or a direct connection. In some embodiments, users are coupled or connected to a system that is in turn coupled or connected to content management system 100 via network or direct connections. Content management system 100 is also coupled to one or more external content systems, represented in FIG. 1 by legacy content systems 114, 116, 118, and 119. In some embodiments, an external content system comprises a system with associated content that has not been ingested into content management system 100 where the ingestion of content comprises taking the associated content under direct management and control of content management system 100. In various embodiments, a legacy or other external content system comprises an enterprise content management (ECM) system, an enterprise resource planning (ERP) system, a customer relations management (CRM) system, a business process management (BPM) system, different version of a system (for example, an older version of content management system 100), enterprise content integration (ECI) system, or enterprise application integration (EAI) system. In some embodiments, external content systems that are not "legacy" content systems, i.e., not an older system that is being managed by a newer content management system 100, are managed virtually as described herein. In some embodiments, a legacy or other external content system includes a content server, metadata, and a content store similar to content system 120. In some embodiments, a legacy or other external content system comprises a data repository.

In the example shown in FIG. 1, content management system 100 includes application 102, content management framework 104, and adapters 106. One or more user systems interact with application 102 in order to make use of content management system functionality (for example, business process management, retention management, security management, etc.). In various embodiments, application 102 interacts with content management framework 104 that enables access to information or content that is stored in legacy content systems 114, 116, 118, and 119 and/or content system 120 or enables the application to store information to legacy content systems 114, 116, 118, and 119 and/or content system 120. To interact with legacy content systems 114, 116, 118, and 119, content management framework 104 is coupled to adapters 106. In some embodiments, content management framework 104 comprises foundation object classes and core operations and logic. Adapters 106 handle interactions between content management system 100 and legacy systems 114, 116, 118, and 119. Adapters 106 include a plurality of adapters represented by 108, 110, and 112. In some embodiments, adapters 108, 110, and 112 are specific to a type of legacy or other external content system. For example, a type of customer relations management system, or a series of systems from the same vendor with similar interfacing requirements, has a corresponding adapter for communication with content management system 100. In the example shown, the interfacing requirements for legacy content system 118 and 119 are similar and content management system 100 uses adapter 112 to interact with both legacy content system 118 and legacy content system 119.

In some embodiments, adapters 106 translate commands from content management system 100 to the appropriate syntax and format required by a type of legacy or other external content system. In some embodiments, adapters 106 normalize the responses from a given type of legacy or other external content system to the appropriate syntax and format required by content management system 100.

Content system 120 includes content server 122, metadata 124, and content store 126. Content server 122 communicates with content management system 100 and provides stored content and/or metadata when requested by and/or via content management system 100 and/or stores content and/or associated metadata for content received from and/or via content management system 100. Metadata 124 contains information related to content stored in content store 126. In some embodiments, metadata 124 comprises a meta-catalog of content objects with respect to which one or more content management functions are available to be performed by and/or via content management system 100. In some embodiments, the meta-catalog includes content objects associated with items of content stored in content store 126 and also reference objects associated with items of content stored in legacy or other external content systems. In some embodiments, metadata information in metadata 124 is coupled with content stored in content store 126—for example, security or retention information is coupled to content so that the security or retention information are always present and/or utilized for content management system applications.

In various embodiments, content management system 100, content system 120, and legacy content systems 114, 116, 118, and 119 are implemented using one or more hardware units, one or more processing units/devices, one or more storage units/devices, or one or more memory units/devices.

Figure 2:
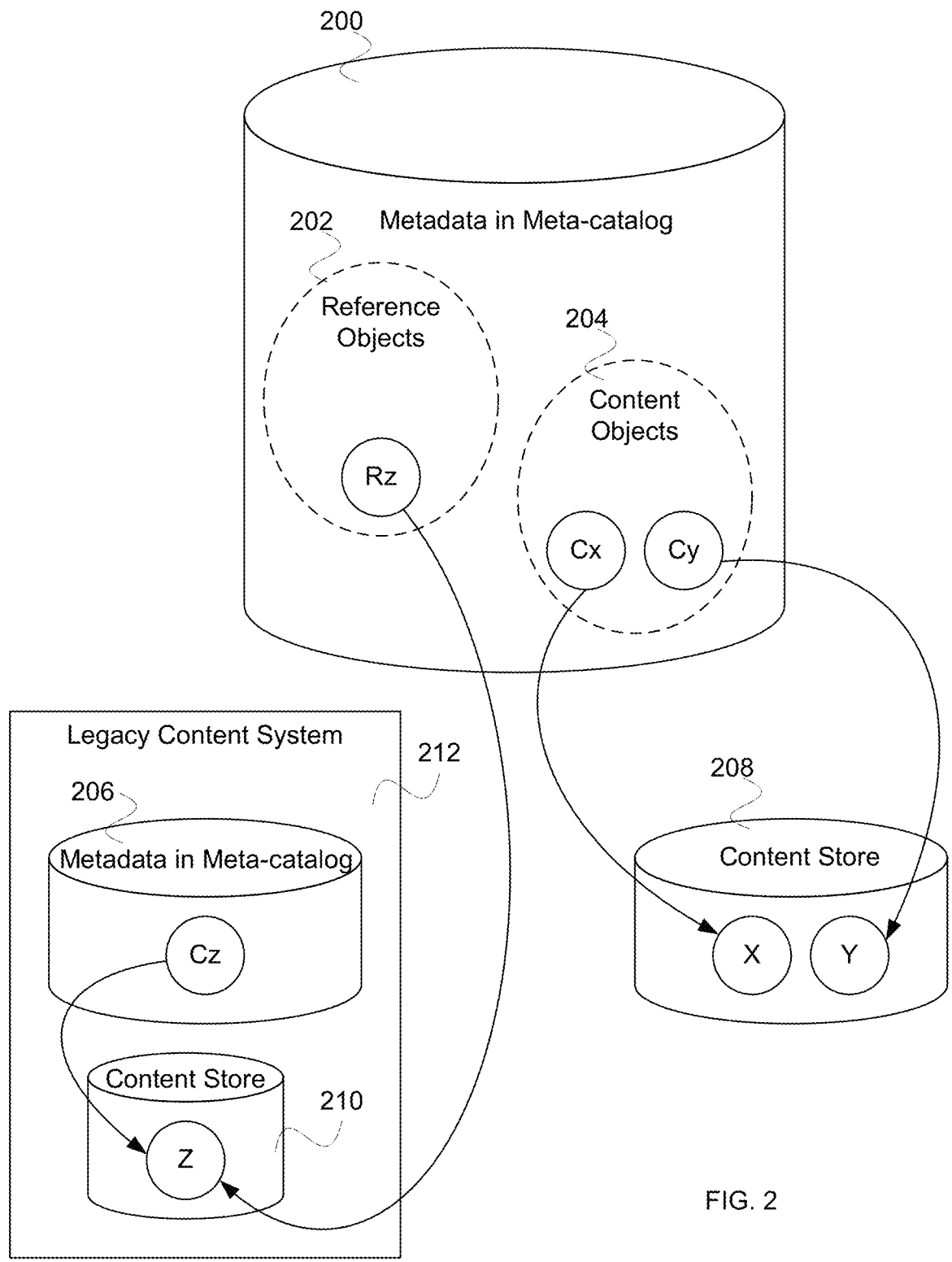
FIG. 2 is a block diagram illustrating an embodiment of reference objects referring to external content.

FIG. 2 is a block diagram illustrating an embodiment of reference objects referring to external content. In some embodiments, metadata in meta-catalog 200 is included in metadata 124 of FIG. 1 and content store 208 is content store 126. In the example shown, metadata in meta-catalog 200 includes content objects 204 that refer to items of content in content store 208. For example, content objects 204 include in the example shown in FIG. 2 content objects Cx and Cy which refer to content items X and Y, respectively, in content store 208. In various embodiments, the content objects comprise a location pointer, e.g., pointing to a location in content store 208 in which a corresponding item of content is stored, a database row entry, a data structure with information such as content title, keywords associated with content, abstract of content, related documents/information, security information, retention information, or rules associated with information—e.g., publishing rules with regard to other formats such as HTML, PDF, etc., version control rules, or business process rules. In various embodiments, a location pointer is a physical address on a storage device, removable storage media, or in a memory or a logical address that enables access to a location on a storage device, removable storage media, or in a memory. Metadata in meta-catalog 200 also includes one or more reference objects 202, represented in FIG. 2 by Rz, that refer to content in one or more legacy content systems represented in FIG. 2 by legacy content system 212. In some embodiments, legacy content system 212 comprises a repository that has not been ingested directly into the content management system so that the information in the repository is not stored in the content management system and is not controlled directly by the content management system. In some embodiments, the legacy content systems are repositories or information systems that are not desired to be the central manager of information held in multiple systems. In the example shown, legacy content system 212 includes one or more items of content represented by Z in content store 210. A reference object Rz refers to the content Z in content store 210 and as described more fully below enables content management functions to be performed with respect to content item Z by and/or via a content management system associated with meta-catalog 200. The content item Z is represented in a legacy content system metadata 206 by a content object Cz. In this example, the legacy content system is a managed content system that, like the content system with which meta-catalog 200 and content store 208 are associated, generates and maintains a set of metadata in which each item of content under management by the legacy content system 212 is represented by a content object such as content object Cz. In some embodiments, external content stored in an external repository to be managed virtually is stored in an external repository that is not a managed repository, e.g., a content server or file system, such that the external content repository/system does not include an external system metadata such as metadata 206. In some embodiments, a reference object such as Rz is generated and populated at least in part by accessing data comprising and/or associated with content item Z. In some embodiments, a reference object such as Rz is generated and populated at least in part by accessing metadata associated with content item Z, such as content object Cz in the example shown.

Figure 3:
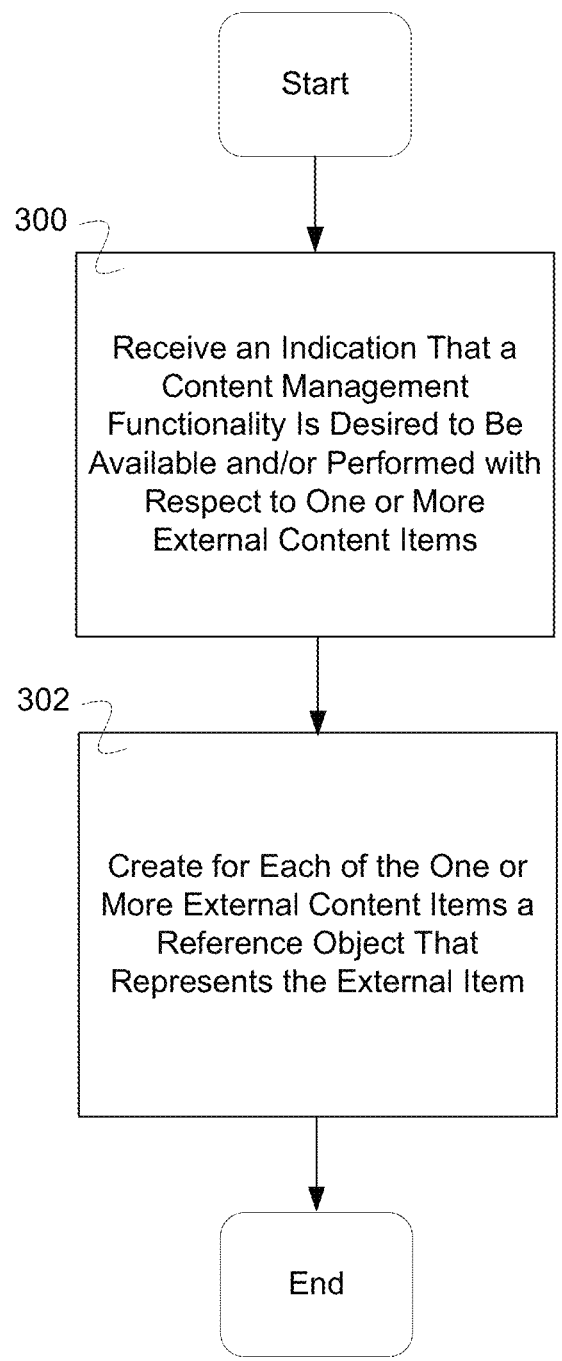
FIG. 3 is a flow diagram illustrating an embodiment of a process for virtual repository management.

FIG. 3 is a flow diagram illustrating an embodiment of a process for virtual repository management. In the example shown, in 300 an indication is received that a content management functionality is desired to be available and/or performed with respect to one or more external content items In various embodiments, content management functionality comprises process automation (for example, work flow automation, life cycle automation, etc.), library services (for example, access control, versioning, encryptions, multiple document representation handling, etc.), repository services (for example, authentication, backup, distributed storage, etc.), core content services (for example search, annotation, rendering to different formats, linking into a group). In some embodiments, the external content items are in legacy content systems for which it is desired to have some centrally available management functionality. In some embodiments, virtual repository management of external content held in legacy content systems enables central management of content without the expense, difficulty, and/or risk associated with ingesting the contents of the legacy content system into the central content management system. In some embodiments, an indication that a management functionality is desired to be available comprises a request that a management functionality be performed. In various embodiments, the indication is received from a user, a user system, an application, a content management application, and/or a system administrator. In some embodiments, the indication is received after a search for content is performed across multiple content systems and content is selected for management from the search results. For example, search for content related to a law suit across an entire company's content systems locates content that is required to be disclosed and/or preserved; the content is selected and managed (retained, indexed, made unchangeable) by the central content system during the law suit. In 302, for each of the one or more external content items a reference object is created that represents the external content item. In some embodiments, the reference object is stored in the metadata in a meta-catalog. In some embodiments, the reference object provides the necessary information for the content management system to access the corresponding content in a legacy content system.

Figure 4:
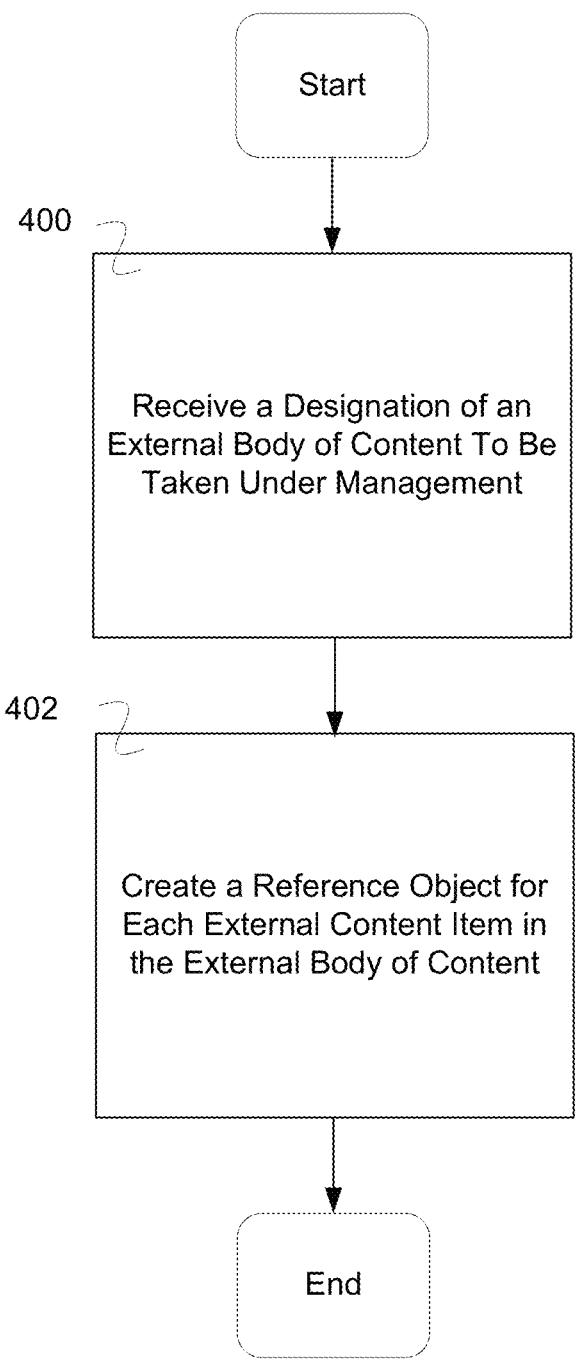
FIG. 4 is a flow diagram illustrating an embodiment of a process for virtual repository management.

FIG. 4 is a flow diagram illustrating an embodiment of a process for virtual repository management. In the example shown, in 400 a designation is received that an external body of content is to be taken under management. In various embodiments, the designation is received from a user, a user system, an application, a content management application, and/or a system administrator. In 402, a reference object is created for each external item of content in the external body of content. In some embodiments, a crawler is used to locate and select each item of content included in the external body of content. In various embodiments, the reference object includes metadata allowing access to and manipulation of the content that is referred to by the reference object. In some embodiments, the process of FIG. 4 is used to bring entire sets and/or bodies of external content items, e.g., all or a designated subset of content items in an external repository, under virtual management, such that content management functions are available centrally with respect to the external items.

Figure 5:
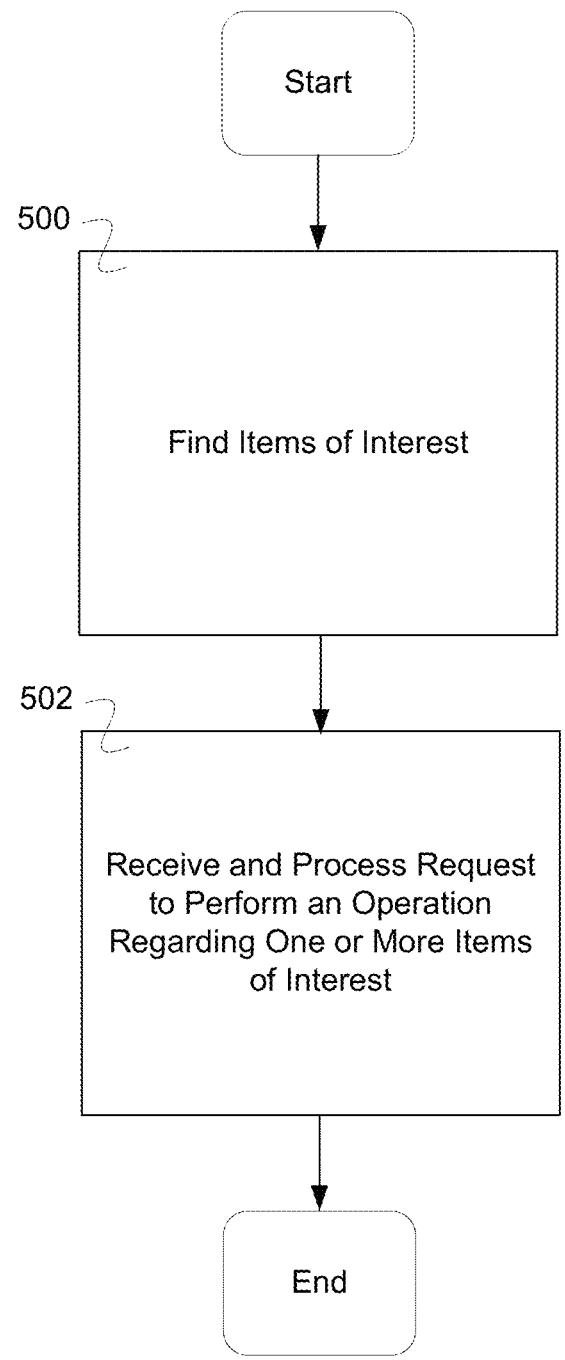
FIG. 5 is a flow diagram illustrating an embodiment of a process for virtual repository management.

FIG. 5 is a flow diagram illustrating an embodiment of a process for virtual repository management. In some embodiments, the process of FIG. 5 is used to bring external content items under virtual management as the need/desire arises to perform a content management function centrally with respect to one or more particular external content items. In some embodiments, the process of FIG. 5 is used instead of and/or in addition to the process of FIG. 4. In the example shown, in 500 items of interest are found. In various embodiments, items of interest are found as a result of one or more searches in one or more repositories, items of interest are located by performing a full text search on a full text index of information in one or more repositories, and/or items of interest are located by performing a search on crawler results of one or more repositories. In 502, a request to perform an operation regarding one or more items of interest is received and processed. In some embodiments, at least a subset of the items of interest may be stored in an external repository and in 502 a reference object is created for any one or more of the items of interest that is/are stored in an external repository, if any, and then the operation is performed regarding the one or more items of interest.

Figure 6:
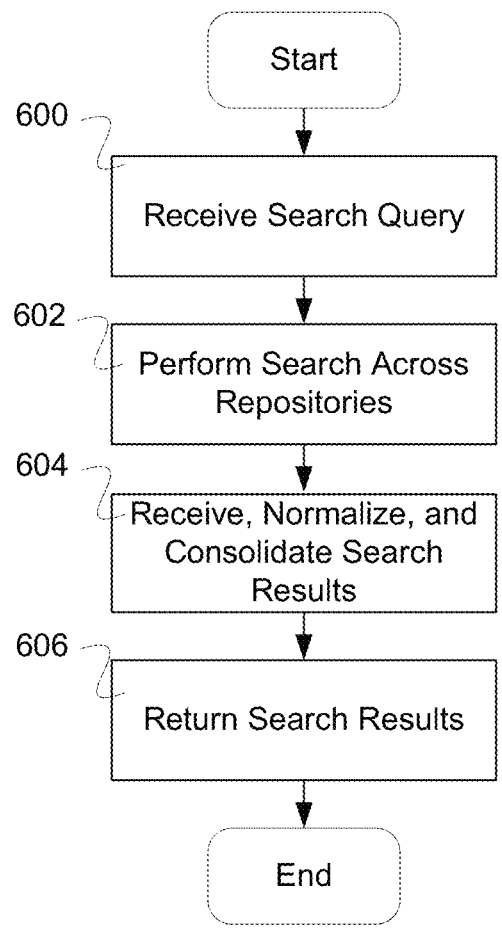
FIG. 6 is a flow diagram illustrating an embodiment of a process for finding objects of interest for virtual repository management.

FIG. 6 is a flow diagram illustrating an embodiment of a process for finding objects of interest for virtual repository management. In some embodiments, the process of FIG. 6 is used to implement 500 in FIG. 5. In the example shown, in 600, a search query is received. In 602, a search is performed across repositories. In some embodiments, the repositories searched include one or more legacy and/or other external content systems. In some embodiments, the search requires translating a search command or series of commands to a command or series of commands appropriate for a given legacy content system. In 604, search results are received, consolidated, and normalized. In some embodiments, the search results require normalization processing in order to format and change syntax so as to be useable by the content management system used to perform the search across repositories. In 606, the search results are returned. In some embodiments, the search results are returned to an application associated with a content management system used to perform the search.

Figure 7:
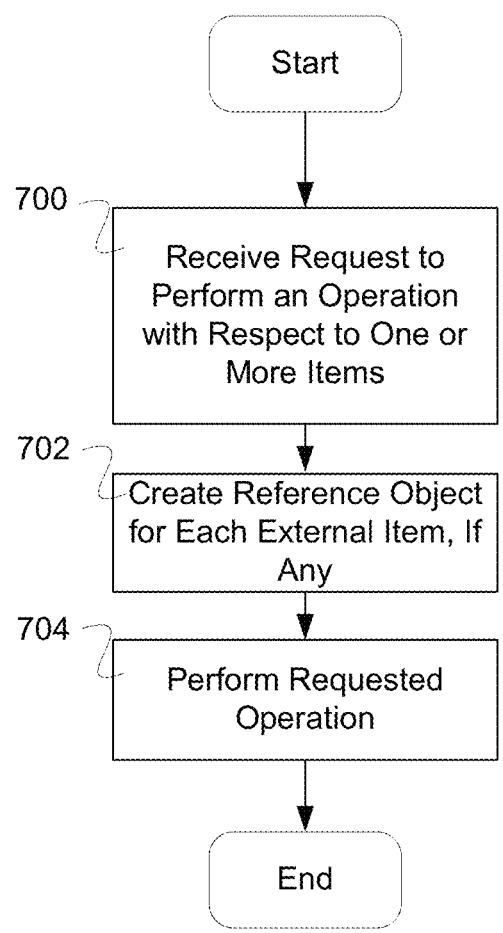
FIG. 7 is a flow diagram illustrating an embodiment of a process for virtual repository management.

FIG. 7 is a flow diagram illustrating an embodiment of a process for virtual repository management. In some embodiments, the process of FIG. 7 is used to implement 502 in FIG. 5. In the example shown, in 700, a request is received to perform an operation with respect to one or more items. In some embodiments, the one or more items are associated with one or more legacy content systems. In 702, a reference object is created for each external content item, if any, associated with the request received at 700. In some embodiments, the reference object comprises information that is stored in a structure in a database that enables the content management system, its applications, and its framework to manipulate, access, and perform operations with respect to the external item of content referred to by the reference object. In some embodiments, the reference object allows operations to be performed with respect to the associated external item of content to the same extent as if the content had been originally created within or ingested into the content management system. In 704, the requested operation is performed.

Figure 8:
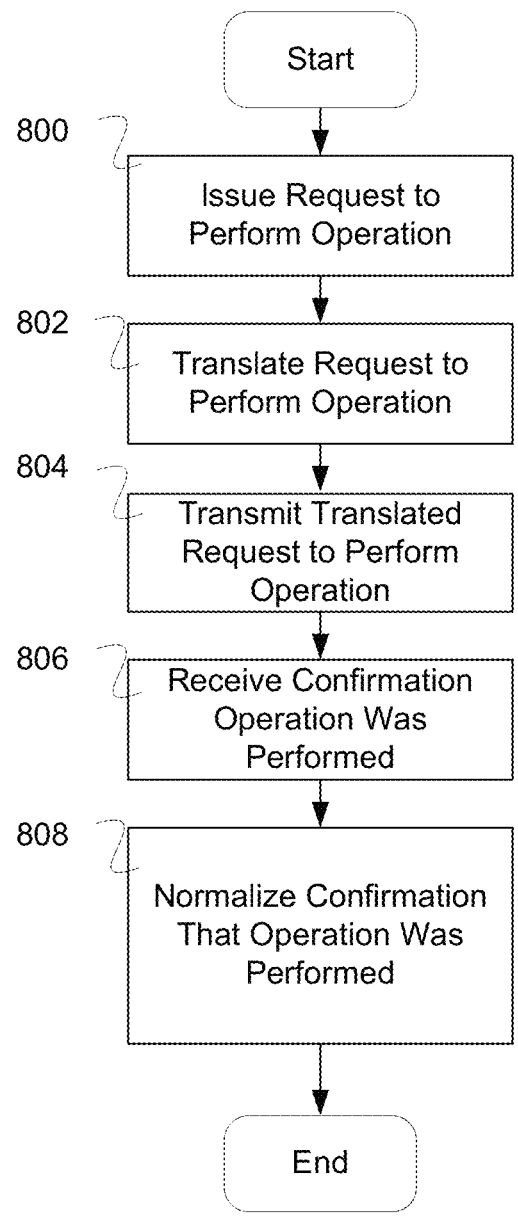
FIG. 8 is a flow diagram illustrating an embodiment of a process for performing an operation with respect to content stored in an external repository under virtual management.

FIG. 8 is a flow diagram illustrating an embodiment of a process for performing an operation with respect to content stored in an external repository under virtual management. In some embodiments, the process in FIG. 8 is used to implement 704 of FIG. 7 with respect to content stored in an external repository. In the example shown, in 800 a request is issued to perform an operation. In some embodiments, the request is issued by an application or by or through a content management framework service or utility to perform the operation. In 802, the request is translated to perform the operation. In some embodiments, an adapter translates the request to perform the operation. In various embodiments, an adapter is used for one type of legacy content system, a series of legacy content systems, systems with similar translation requirements, and/or all types of legacy content systems. In 804, the translated request to perform the operation is transmitted. In 806, confirmation is received that the operation was performed. In some embodiments, the operation also returns some information in addition to a confirmation. In 808, the confirmation message is normalized. In some embodiments, normalization comprises processing or formatting in order for appropriate utilization of the information by the content management system. In some embodiments, the additional returned information is normalized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for virtual repository management comprising:
   a meta-catalog;
   a content store; and
   a processor configured to:
      provide a metadata content object in the meta-catalog that refers to a first content item stored in the content store, wherein the metadata content object allows performance of one or more content management functionalities with respect to the first content item;
      provide a metadata reference object in the meta-catalog that refers to a second content item stored in a legacy content system, wherein the metadata reference object allows performance of the one or more content management functionalities with respect to the second content item, wherein the metadata reference object is generated based at least in part on a second content item metadata stored in the legacy content system, wherein the metadata reference object is provided based on a legacy content object associated with the second content item;
      provide the legacy content object that refers to the second content item, the legacy content object being located in the legacy content system;
      receive a request to perform a content management functionality with respect to the second content item; and
      use the metadata reference object to perform the requested content management functionality on the second content item including by translating the requested content management functionality into a syntax or format required by the legacy content system and transmitting the translated request to cause the legacy content system to perform the requested content management functionality, wherein the metadata reference object allows performance to the same extent of the one or more content management functionalities-with respect to the second content item as with respect to content items that are stored within or have been ingested into the content store.

2. A system as in claim 1, wherein the metadata content object is one of a plurality of metadata content objects.

3. A system as in claim 2, wherein each of the plurality of metadata content objects refers to each of a plurality of content items stored in the content store.

4. A system as in claim 1, wherein the metadata content object comprises a location pointer.

5. A system as in claim 4, wherein the location pointer points to a location in which a corresponding item of content is stored.

6. A system as in claim 4, wherein the location pointer points to a database row entry.

7. A system as in claim 4, wherein the location pointer points to a database structure.

8. A system as in claim 7, wherein the database structure includes a content title.

9. A system as in claim 7, wherein the database structure includes a keyword associated with the content.

10. A system as in claim 7, wherein the database structure includes an abstract.

11. A system as in claim 7, wherein the database structure includes related documents.

12. A system as in claim 7, wherein the database structure includes security information.

13. A system as in claim 7, wherein the database structure includes retention information.

14. A system as in claim 7, wherein the database structure includes associated rules.

15. A system as in claim 14, wherein the associated rules comprise publishing rules.

16. A system as in claim 14, wherein the associated rules comprise version control rules.

17. A computer program product for virtual repository management, the computer program product being embodied in a non-transitory computer readable medium and comprising computer instructions for:
   provide, using a processor, a metadata content object in a meta-catalog that refers to a first content item stored in a content store, wherein the metadata content object allows performance of one or more content management functionalities with respect to the first content item;

provide a metadata reference object in the meta-catalog that refers to a second content item stored in a legacy content system, wherein the metadata reference object allows performance of the one or more content management functionalities with respect to the second content item, wherein the metadata reference object is generated based at least in part on a second content item metadata stored in the legacy content system, wherein the metadata reference object is provided based on a legacy content object associated with the second content item;

provide the legacy content object that refers to the second content item, the legacy content object being located in the legacy content system;

receive a request to perform a content management functionality with respect to the second content item; and use the metadata reference object to perform the requested content management functionality on the second content item including by translating the requested content management functionality into a syntax or format required by the legacy content system and transmitting the translated request to cause the legacy content system to perform the requested content management functionality, wherein the metadata reference object allows performance to the same extent of the one or more content management functionalities-with respect to the second content item as with respect to content items that are stored within or have been ingested into the content store.

18. A method for virtual repository management comprising:

provide, using a processor, a metadata content object in a meta-catalog that refers to a first content item stored in a content store; and store, wherein the metadata content object allows performance of one or more content management functionalities with respect to the first content item;

provide a metadata reference object in the meta-catalog that refers to a second content item stored in a legacy content system, wherein the metadata reference object allows performance of the one or more content management functionalities with respect to the second content item, wherein the metadata reference object is generated based at least in part on a second content item metadata stored in the legacy content system, wherein the metadata reference object is provided based on a legacy content object associated with the second content item;

provide the legacy content object that refers to the second content item, the legacy content object being located in the legacy content system;

receive a request to perform a content management functionality with respect to the second content item; and use the metadata reference object to perform the requested content management functionality on the second content item including by translating the requested content management functionality into a syntax or format required by the legacy content system and transmitting the translated request to cause the legacy content system to perform the requested content management functionality, wherein the metadata reference object allows performance to the same extent of the one or more content management functionalities-with respect to the second content item as with respect to content items that are stored within or have been ingested into the content store.

\* \* \* \* \*